US 8,046,783 B2

(12) United States Patent
Murakami et al.

(10) Patent No.: US 8,046,783 B2
(45) Date of Patent: Oct. 25, 2011

(54) DISC DRIVE DEVICE

(75) Inventors: Kouken Murakami, Gunma-ken (JP);
Hitoshi Nunoya, Gunma-ken (JP);
Satoru Kamoto, Gunma-ken (JP);
Hiromi Minamimura, Gunma-ken (JP)

(73) Assignee: Victor Company of Japan, Limited, Yokohama-shi, Kanagawa-ken (JP)

( * ) Notice: Subject to any disclaimer, the term of this patent is extended or adjusted under 35 U.S.C. 154(b) by 531 days.

(21) Appl. No.: 12/292,857

(22) Filed: Nov. 26, 2008

(65) Prior Publication Data
US 2009/0144761 A1    Jun. 4, 2009

(30) Foreign Application Priority Data
Nov. 30, 2007   (JP) ................... 2007-310451

(51) Int. Cl.
*G11B 17/04*   (2006.01)
(52) U.S. Cl. .................. 720/617; G9B/17.013
(58) Field of Classification Search .......... 720/617; G9B/17.013
See application file for complete search history.

(56) References Cited

U.S. PATENT DOCUMENTS
7,340,750 B2 *   3/2008   Tsai et al. ............... 720/617

FOREIGN PATENT DOCUMENTS
JP         10-031855           2/1998
* cited by examiner

*Primary Examiner* — Hoai V Ho
(74) *Attorney, Agent, or Firm* — The Nath Law Group; Jerald L. Meyer (57) ABSTRACT

A disc drive device includes a disc conveyance mechanism, a slide cam and a trigger slider. The disc conveyance mechanism has a cam driven element protruded on a movement route of the slide cam and a conveyance roller energized in a direction coming into pressure-contact with a disc by an elastic member. The slide cam has a cam contour part moving the conveyance roller in a direction being spaced apart from the disc against an elastic force of the elastic member while pressing the cam driven element. The cam contour part has a flat surface part formed in parallel to a moving direction of the slide cam, in order to move only the trigger slider, while restraining the slide cam by contact pressure of the cam driven element to stop the slide cam temporary, when conveying the disc inside a cabinet toward an aperture side of the cabinet.

3 Claims, 7 Drawing Sheets

DISC DRIVE DEVICE

BACKGROUND OF THE INVENTION

1. Field of the Invention

The present invention relates to a slot-in type disc drive device in which a disc such as CD (Compact Disc) or DVD (Digital Versatile Disc) is conveyed directly in a cabinet without using a tray. More particularly, the present invention relates to a disc drive device capable of chucking (holding) a disc appropriately, even when the disc is re-conveyed (reload) to a chucking position inside the cabinet while an ejecting operation of a disc interrupts halfway.

2. Description of the Related Art

Conventionally, as a disc conveyance system in a disc drive device, in addition to a tray conveyance system conveying a disc in a cabinet while putting the disc on a tray, a slot-in system is known where the disc is directly conveyed in the cabinet without using the tray.

In the slot-in system, for instance, the disc is conveyed in the cabinet under the condition that a rubber roller for disc conveyance is pressed against one single side of the disc, and in the thickness direction of the disc, the disc is sandwiched between the rubber roller and a synthetic resin plate fixed in place. However, when performing reproduction of recording information while turning the disc which is conveyed up to a fixed position (chucking position) inside the cabinet, since it is not possible to turn the disc under the condition that the rubber roller comes into pressure-contact with the disc, the rubber roller is provided movably in the direction spaced apart from the disc inside the cabinet, and is spring-energized in the direction coming into pressure-contact with the disc. For this reason, when the disc is reached to a chucking position, the rubber roller is separated from the disc.

A mechanism separating the rubber roller from the disc is disclosed in the Japanese Laid-Open Patent Publication No. H10 (1998)-31855. In this mechanism, a slide plate is provided inside the cabinet. The slide plate has a rack, and is capable of being moved in the direction in which the rubber roller conveys the disc. When the disc is conveyed to the position just before a chucking position, a pinion which rotates in synchronization with the rotation of the rubber roller, engages with the rack of the slide plate, and the slide plate starts to move. When the slide plate moves, a slope-like cam contour part formed on the slide plate presses a cam driven element protruded from the rubber roller side. By the press, the rubber roller moves in the direction separated from the disc.

However, in this mechanism, in the process where the disc is ejected from the cabinet, when a loading operation (reload operation) of the disc is performed while the ejecting operation of the disc is interrupted caused by missoperation of user, interrupted to prevent an opening and closing operation of the front panel, or interrupted to prevent fall of the disc, there is possibility that a chucking operation of the disc starts before the disc reaches the chucking position, so that the disc damages.

That is, in the process of ejecting the disc from the cabinet, there is no problem if the reload operation of the disc starts after the slide plate moves in the direction ejecting the disc until the pinion rotating in synchronization with the rotation of the rubber roller becomes not engaged with the rack on the slide plate. On the other hand, in the process of ejecting the disc from the cabinet, when the reload operation of the disc starts before the pinion becomes not engaged with the rack, at that time point, since the rubber roller starts to come into contact with one single surface side of the disc while chucking of the disc is released, the disc becomes moved to an aperture side (ejecting direction) of the cabinet to a certain extent. In this state, the slide plate is immediately moved in the direction opposed to the direction ejecting the disc. Therefore, the rubber roller becomes separated from the disc with the condition that the disc is not conveyed sufficiently to the chucking position, as a result, the chucking defect is caused.

SUMMARY OF THE INVENTION

The present invention provides a disc drive device in a slot-in system capable of chucking a disc appropriately even when an operation of the device is switched to a reload operation of the disc in the course of an ejecting operation of the disc.

In order to achieve the above described object, the present invention provides a disc drive device comprising: a cabinet that has an aperture for putting in and out a disc to and from inside the cabinet; a disc conveyance mechanism that has a conveyance roller for conveying the disc between an inside of the cabinet and the aperture while coming into pressure-contact with the disc inserted into the aperture from a single surface side of the disc; a roller driver that has a driving source, for forwardly/reversely rotating the conveyance roller; a gear transmission unit that has a pinion rotating due to a driving force from the driving source; a slide cam that is capable of performing a reciprocating movement in a conveyance direction of the disc; and a trigger slider that has a rack engaging with the pinion and moves when the rack engages with the pinion, wherein the trigger slider moves the slide cam in the same direction as a moving direction of the trigger slider while engaging with a part of the slide cam in the course of movement of the trigger slider, wherein the disc conveyance mechanism has a cam driven element protruded on a movement route of the slide cam; the conveyance roller is energized in a direction coming into pressure-contact with the disc by an elastic member; the slide cam has a cam contour part moving the conveyance roller in a direction being spaced apart from the disc against an elastic force of the elastic member while pressing the cam driven element; and the cam contour part has a flat surface part formed in parallel to a moving direction of the slide cam, in order to move only the trigger slider, while restraining the slide cam by contact pressure of the cam driven element to stop the slide cam temporary, when conveying the disc inside the cabinet toward the aperture side of the cabinet.

According to the present invention, the cam contour part of the slide cam moving the conveyance roller in the direction being spaced apart from the disc has a flat surface part formed in parallel to the moving direction of the slide cam. By forming the flat surface part on the cam contour part, the slide cam restrained to stop temporary at the time the disc is ejected, so that only the trigger slider moves. Therefore, when a reload operation of the disc is performed in the course of ejecting operation of the disc, since only the trigger slider moves before the slide cam moves, even the disc is moved in the ejecting direction to a certain extent caused by the ejecting operation of the disc, the conveyance roller is capable of conveying the disc to the chucking position while coming into contact with the disc, before completing the chucking operation of the disc while the slide cam starts to move, upon rotating in synchronization with the rotation of the pinion. As a result, the disc drive device is capable of preventing the disc from being chucked at an improper position (prevention of chucking defect).

In the preferred embodiment of the present invention, the slide cam has a chucking cam part that leads a clamp board chucking the disc in a direction of separating and contacting from and with a turntable for turning the disc, in cooperation with the turntable.

According to this embodiment, since the slide cam has the chucking cam part leading the clamp board chucking the disc in the direction of separating and contacting from and with the turntable in cooperation with the turntable, the disc drive device is capable of realizing a simple structure with small number of components, and is capable of enhancing a timing accuracy of movement of the conveyance roller, a chucking operation of the disc, and a release operation of chucking of the disc.

In the preferred embodiment of the present invention, the cabinet has a pressure receiving part sandwiching the slide cam from a vertical direction of the flat surface part of the cam contour part in cooperation with the cam driven element, when the cam driven element lies on the flat surface part.

According to this embodiment, since the cabinet has the pressure receiving part sandwiching the slide cam from the vertical direction of the flat surface part in cooperation with the cam driven element, the disc drive device is capable of further enhancing a restraining force of the slide cam when the cam driven element lies on the flat surface part of the cam contour part.

DESCRIPTION OF THE PREFERRED EMBODIMENTS

There will be described a disc drive device according to an embodiment of the present invention in detail below while referring to FIGS. 1 to 11.

Figure 1:
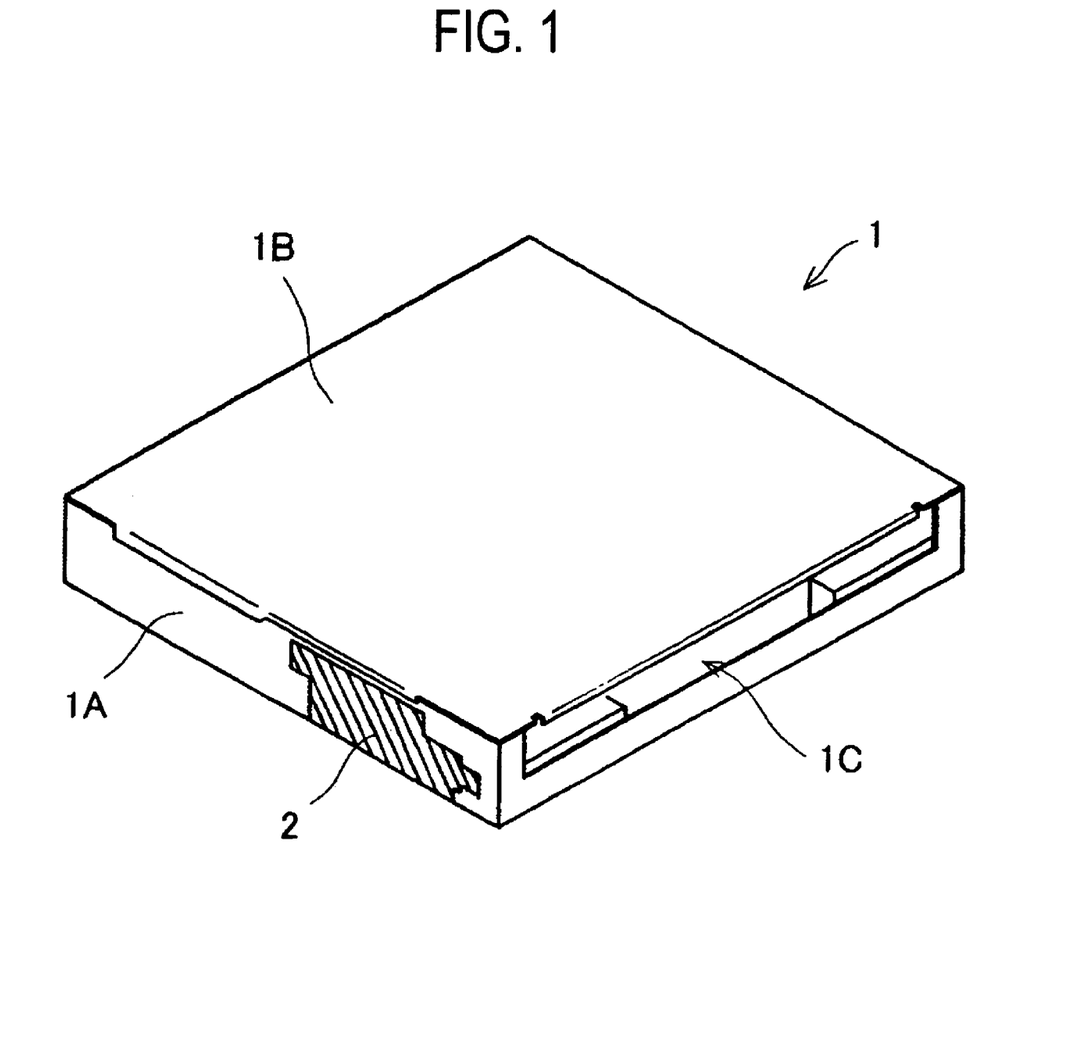
FIG. 1 is a perspective outline view of a disc drive device according to an embodiment of the present invention.

As shown in FIG. 1, a cabinet 1 of the disc drive device includes a bottom case 1A, a top plate 1B, an aperture 1C and a side plate 2. The bottom case 1A has a U-shaped cross section. The top plate 1B is joined to an upper part of the bottom case 1A. The aperture 1C is formed in rectangle shape, and is provided between one end front surface part of the bottom case 1A and the top plate 1B. A disc (optical disc or magneto-optical disc) is carried in (loaded) inside the cabinet 1 or carried out (ejected) from inside the cabinet 1 via the aperture 1C. The disc is an information recording medium such as CD, DVD, or MD (Mini Disc: trademark) accommodated in a cartridge. The side plate 2 is made of synthetic resin, and is fixed to a side surface of the bottom case 1A. In the inner side surface of the side plate 2, there is provided a gear transmission unit 20 described later.

Figure 2:
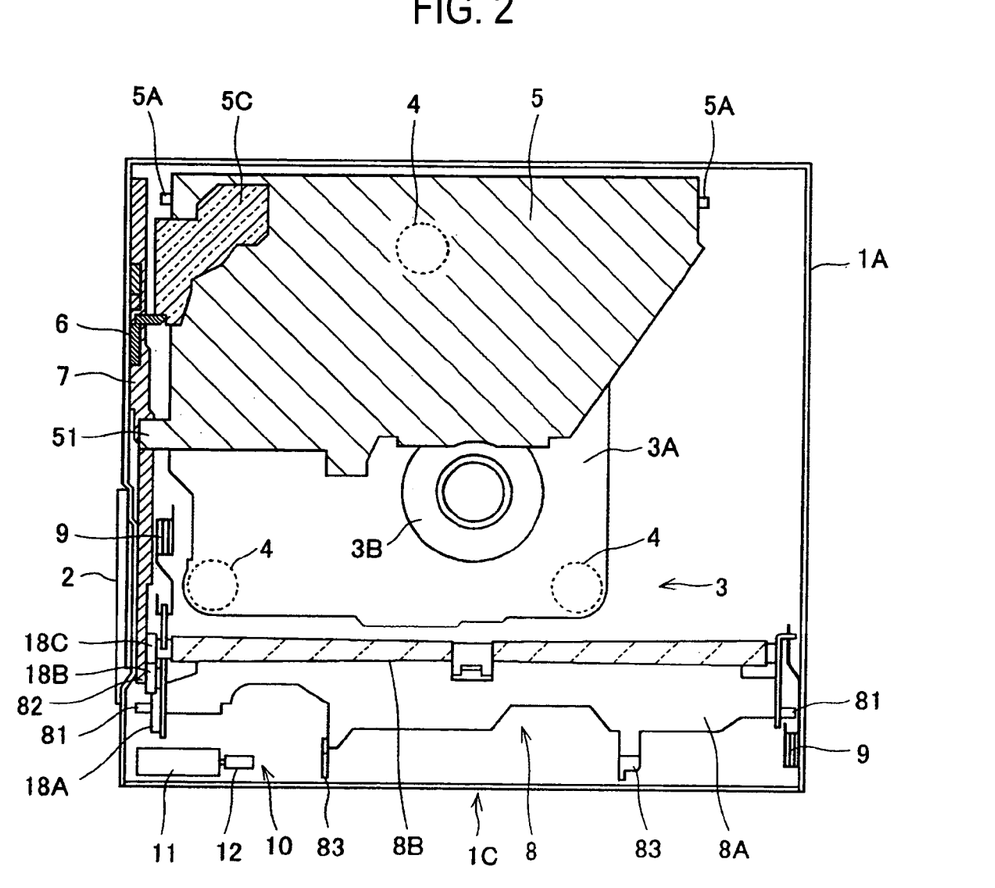
FIG. 2 is a plan view of the inside of the disc drive device according to the embodiment of the present invention.

As shown in FIG. 2, a, drive unit 3 constitutes a principal part of the disc drive device, and includes a plate shape unit base 3A, a turntable 3B, a pickup (not shown) and the like. The unit base 3A is supported elastically by the bottom case 1A via a dumper 4. This suppresses vibration propagated to the drive unit 3 from the bottom case 1A. The turntable 3B is used to turn the disc on the unit base 3A. The pickup moves in the radial direction of the disc along a disc surface of the disc supported by the turntable 3B.

A flap plate 5 is mounted to the unit base 3A, and is capable of being swung with respect to a fulcrum shaft 5A as center. A disc shaped clamp board 5B (referring to FIG. 6) is mounted on the flap plate 5 at a position opposed to the turntable 3B. The disc is chucked (held) by the turntable 3B and the clamp board 5B at the central part of the disc. An actuation plate 5C is movably mounted on the flap plate 5, and presses a trigger slider 6 described later.

Figure 3:
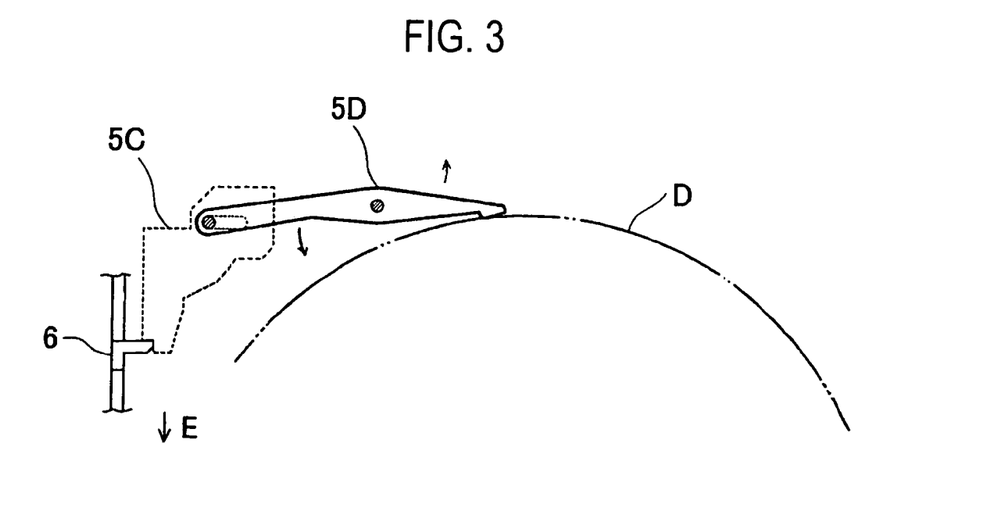
FIG. 3 is an explanation view of a part and periphery of a disc immediately before the disc drive device performs a chucking operation of the disc according to the embodiment of the present invention.

As shown in FIG. 3, a swingable lever 5D is mounted on a surface of the flap plate 5 at the side of drive unit 3. The swingable lever 5D has one end positioned on a conveyance route of the disc D and the other end engaging with the actuation plate 5C. When the disc D is conveyed to the position just before the chucking position in the clamp board 5B, one end of the swingable lever 5D is pressed by an end surface of the disc D, and the actuation plate 5C compresses the trigger slider 6 in the E direction (aperture 1C side, ejecting direction of the disc D), while moving in the E direction. Herewith, the disc drive device starts the chucking operation (operation in which the clamp board 5B heads toward the turntable 3) of the disc. Although the clamp board 5B of the flap plate 5 is always energized by a spring in the direction approaching to the turntable 3B, the clamp board 5B is apart from the turntable 3B while a projecting piece 51 formed on the flap plate 5 is pressed by a slide plate 7 described later. The disc D is moved between the turntable 3B and the clamp board 5B in that state.

As shown in FIG. 2, a disc conveyance mechanism 8 conveys the disc between the inside of the cabinet 1 and the aperture 1C. The disc conveyance mechanism 8 rotatably supports both end parts of a conveyance roller 8B with a plate shaped roller receiver 8A. The roller receiver 8A extends along a width direction of the aperture 1C, and is swingably mounted to the bottom case 1A via fulcrum shafts 81 protruded at both sides of the roller receiver 8A. The conveyance roller 8B is disposed in parallel to the width direction of the aperture 1C while being adjacent to the drive unit 3, and a diameter of the conveyance roller 8B becomes small gradually as progressing from both end parts of the conveyance roller 8B to the central part. Due to this shape, when the conveyance roller 8B comes into pressure-contact with the disc from a single surface side of the disc, only both end parts of the conveyance roller 8B are brought into pressure-contact with a perimeter edge of the disc. Herewith, it is possible to prevent the conveyance roller 8B from imparting scratches on the disc during conveying the disc.

One pair of elastic members (torsion coil springs) 9, 9 is mounted to the bottom case 1A. Each elastic member 9 has one end locked by the roller receiver 8A, herewith, the conveyance roller 8B is energized in the direction of being come into pressure-contact with the disc via the roller receiver 8A.

Figure 4:
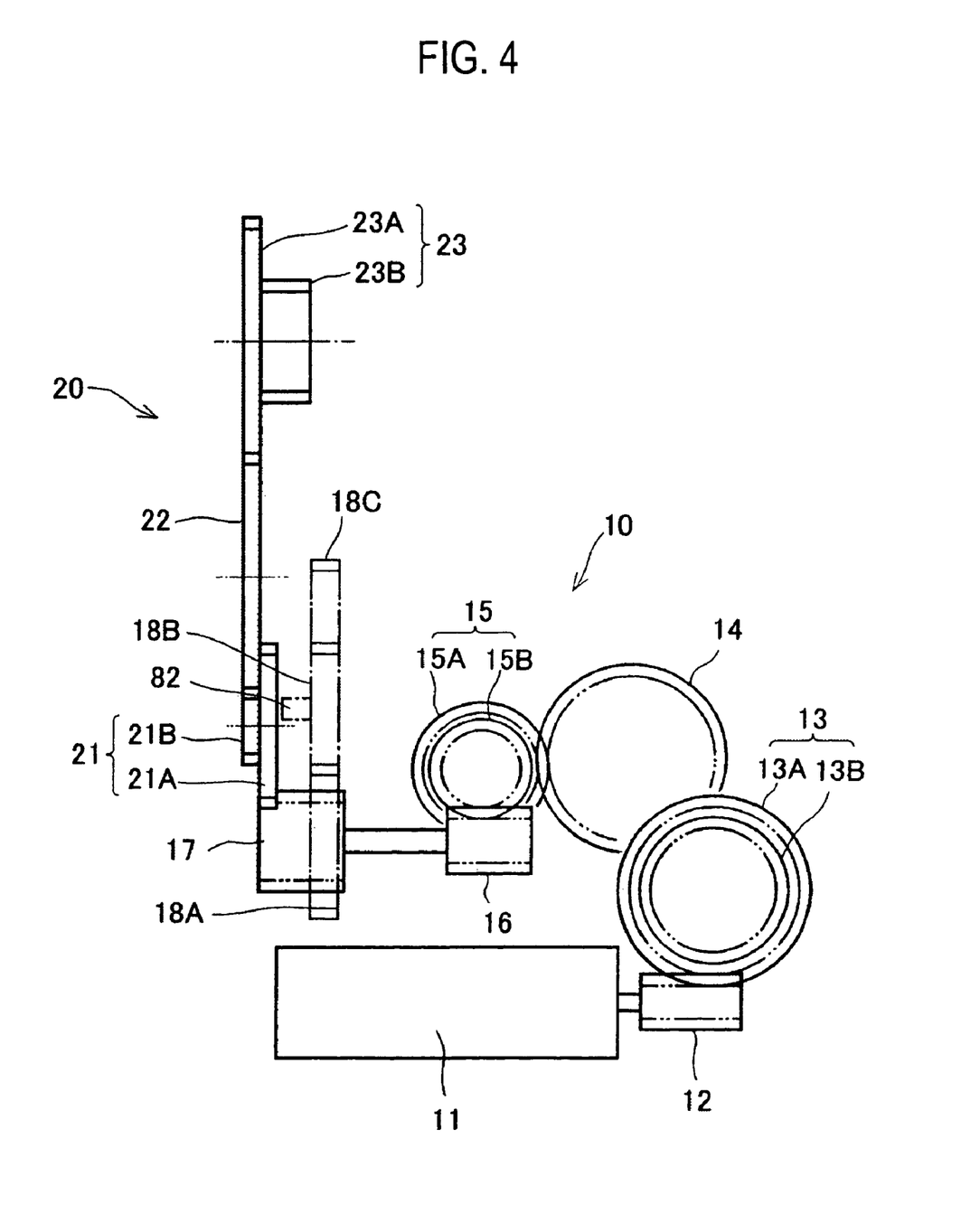
FIG. 4 is a plan view of a roller driving unit and a gear transmission unit of the disc drive device according to the embodiment of the present invention.

A roller driver 10 forwardly/reversibly rotates the conveyance roller 8B. As shown in FIGS. 2 and 4, the roller driver 10 includes a driving source (motor) 11, a worm 12 and gears 13 to 18C. The driving source 11 is fixed to the bottom case 1A. The worm 12 is fixed to a drive shaft of the driving source 11. The gear 13 has a worm wheel part 13A engaging with the worm 12 and a small diameter part 13B. The gear 14 engages with the small diameter part 13B of the gear 13. The gear 15 has a large diameter part 15A engaging with the gear 14 and a small diameter part 15B. The gear 16 engages with the small diameter part 15B of the gear 15. The gear 17 is concentrically fixed to the gear 16. The gear 18A engages with the gear 17. The gear 18B engages with the gear 18A. The gear 18C engages with the gear 18B. The gears 13 to 17 are rotatably mounted to a bottom surface part of the bottom case 1A. The gears 18A to 18C are mounted on one end of the roller receiver 8A.

The gear 18A is rotatably mounted on the fulcrum shaft 81 resulting in a swing center of the roller receiver 8A. The gear 18C is fixed to a shaft end of the conveyance roller 8B. A center shaft of the gear 18B as an idler, projects on a movement route of the slide cam 7 from one end of the roller receiver 8A as a cam driven element 82. The cam driven element 82 moves the conveyance roller 8B in the direction spaced apart from the disc against an elastic force of the elastic members 9, 9.

As shown in FIG. 2, claws 83, 83 are formed on the roller receiver 8A. The claws 83, 83 are formed perpendicular to the bottom surface part of the bottom case 1A when the conveyance roller 8B is apart from the disc (that is, when the disc is chucked by the turntable 3B and the clamp board 5B), to close the aperture 1C.

A gear transmission unit 20 shown in FIG. 4 is installed on a side plate 2 to transmit a driving force of the roller driver 10 (driving source 11) to a trigger slider 6. The gear transmission unit 20 includes a two stages gear 21, a gear 22 and a two stages gear 23. The two stages gear 21 has a large diameter part 21A engaging with the gear 17 of the roller driver 10 and a small diameter part 21B. The gear 22 engages with the small diameter part 21B of the two stages gear 21. The two stages gear 23 has a large diameter part 23A engaging with the gear 22 and a pinion 23B being a small diameter part.

Figure 5:
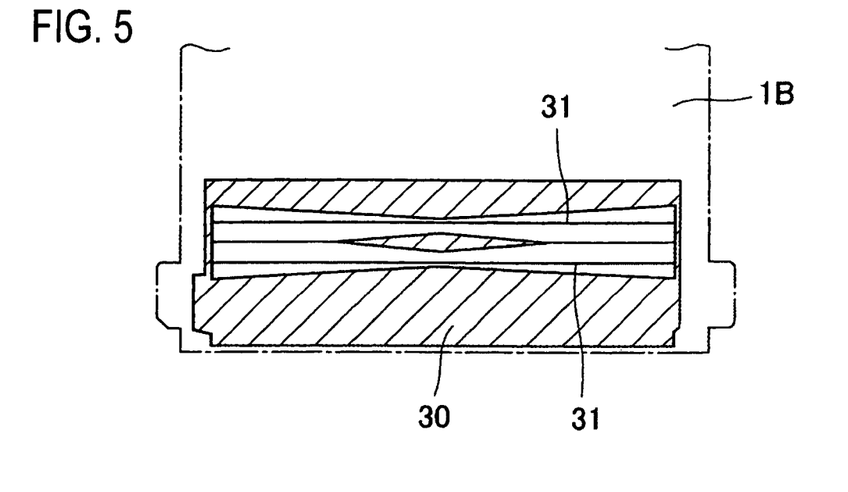
FIG. 5 is a bottom plan view of a top plate of a cabinet of the disc drive device according to the embodiment of the present invention.

As shown in FIG. 5, a liner plate 30 is fixed to a bottom surface of the top plate 1B. The disc is conveyed into the cabinet 1 while being sandwiched between the conveyance roller 8B and the liner plate 30. The liner plate 30 has protruded streaks 31, 31 extending in a direction orthogonal to the conveyance direction of the disc. Each projecting amount of both end parts of each protruded streak 31 is larger than the projecting amount of the central part of each protruded streak 31. Due to this shape, when the conveyance roller 8B comes into pressure-contact with a side surface opposed to a surface with which the conveyance roller 8B comes into pressure-contact, both end parts of the respective protruded streaks 31, 31 come into pressure-contact with only a perimeter edge of the disc. Therefore, during conveying the disc, it is possible to prevent the protruded streaks 31, 31 from imparting scratches on the disc.

Figure 6:
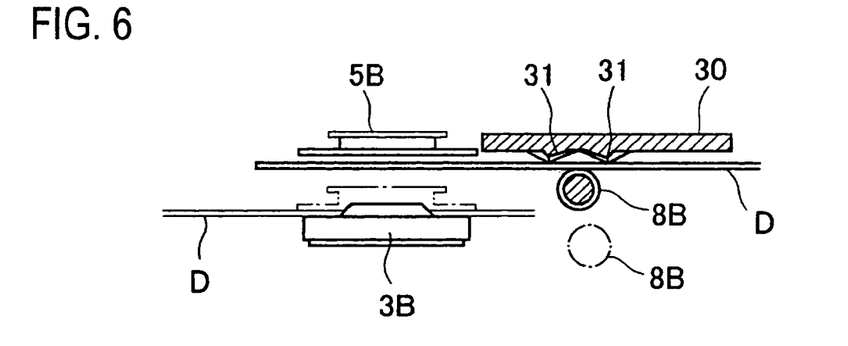
FIG. 6 is an explanation view of the state where the disc is chucked in the disc drive device according to the embodiment of the present invention.

As shown in FIG. 6, during conveying the disc D, the clamp board 5B forms a gap to permit passage of the disc D between the turntable 3H and the clamp board 5B while being spaced apart from the turntable 3B. And then, when the disc D reaches the chucking position (position in which center of the disc D lies on an axial line of the turntable 3B), the clamp board 5B chucks the center part of the disc D together with the turntable 3B while approaching to the turntable 3B, and the conveyance roller 8B makes the disc D in chucking state rotatable while being spaced apart from the disc D.

Figure 7:
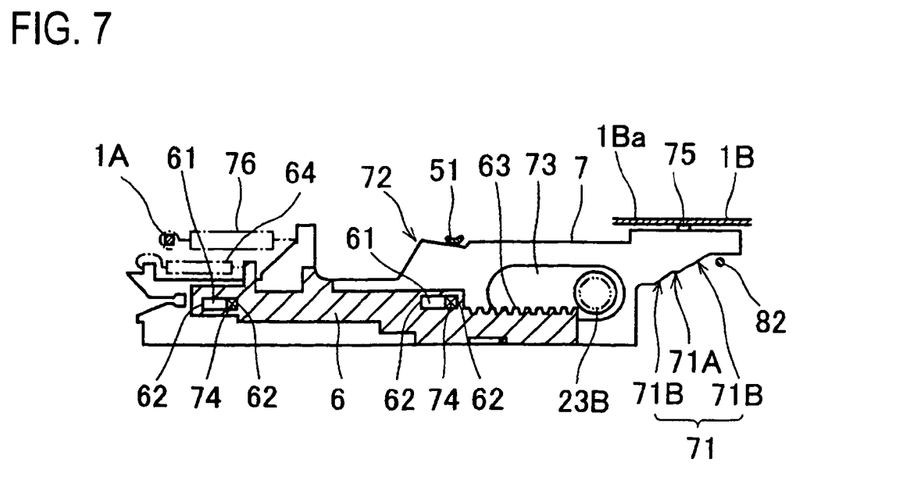
FIG. 7 is a side view of a trigger slider and a slide cam of the disc drive device according to the embodiment of the present invention.

As shown in FIG. 7, the slide cam 7 is formed of a plate member such as synthetic resins and is provided with a cam contour part 71, a chucking cam part 72, a horizontally long window part 73, projecting engagement parts 74, 74 and a boss part 75. The cam driven element 82 shown in FIGS. 2 and 4 comes into contact with the cam contour part 71 due to elastic force of the elastic member 9. The cam contour part 71 is formed on the slide cam 7 so that the cam driven element 82 moves in the required direction as the slide cam 7 moves. The chucking cam part 72 is formed on the slide cam 7 so that the projecting piece 51 of the flap plate 5 moves in the required direction as the slide cam 7 moves. The window part 73 is formed between the cam contour part 71 and the chucking cam part 72 so that the pinion 23B engages with a rack 63 of the trigger slider 6 as the trigger slider 6 moves. The engagement parts 74, 74 engage with the trigger slider 6. The boss part 75 is formed on a side surface opposed to a side surface on which the cam contour part 71 is formed, and comes into slide-contact with the top plate 1B. A part of the top plate 1B with which the boss part 75 comes into slide-contact, is a pressure receiving part 1Ba making a reaction force of pressing force act to the slide cam 7 due to the cam driven element 82. Meanwhile, the boss part 75 may also be taken to as a pressure receiving part 1Ba, while forming the boss part 75 on the top plate 1B faced to a side surface opposed to a side surface with which the cam contour part 71 formed.

As shown in FIG. 2, the slide cam 7 is capable of moving in the conveyance direction (horizontal direction of FIG. 7) of the disc while being disposed adjacent to an inner side surface of the bottom case 1A. The slide cam 7 is energized in the left direction (loading direction of the disc) of FIG. 7, upon connecting a part of the slide cam 7 with the bottom case 1A by a spring 76. Meanwhile, the moving direction of the slide cam 7 is reverse to the moving direction of the disc.

The cam contour part 71 has a flat surface part 71A and oblique surface parts 71B, 71B. The flat surface part 71A is formed on the cam contour part 71 so as to become parallel to the moving direction of the slide cam 7. The oblique surface parts 71B, 71B incline along the moving direction of the slide cam 7 via the flat surface part 71A. When the cam driven element 82 lies on the flat surface part 71A during movement of the slide cam 7, contact pressure (pressing force) of the cam driven element 82 acts on the flat surface part 71A from the vertical direction.

The trigger slider 6 is formed of a plate member such as synthetic resins, and is provided with elongated holes 61, 61, pressurization parts 62, 62, 62 and 62, the rack 63 and a spring 64. The trigger slider 6 is capable of moving in the same direction as the moving direction of the slide cam 7 upon inserting the engagement part 74 of the slide cam 7 into the elongated hole 61. The pressurization parts 62, 62, 62 and 62 are formed on both ends of the elongated holes 61, 61, and are capable of pressurizing the engagement parts 74, 74 inserted into the elongated holes 61, 61. The slide cam 7 integrally moves with the trigger slider 6 in the same direction as the moving direction of the trigger slider 6 because the engagement parts 74, 74 are pressed by the pressurization parts 62, 62. The trigger slider 6 and the slide cam 7 are capable of relatively moving each other by length of the elongated holes 61, 61. That is, the trigger slider 6 is capable of moving individually until the engagement parts 74, 74 are pressed by the pressurization parts 62, 62. The rack 63, when the trigger slider 6 moves by a certain distance in the ejecting direction, becomes engaged with the pinion 23B inserted into the window part 73. The trigger slider 6 moves in the rotation direction of the pinion 23B because the rack 63 engages with the pinion 23B. Since the trigger slider 6 which is connected to the slide cam 7 with the spring 64, is energized in the left direction of FIG. 7 and the slide cam 7 which is connected to the bottom case 1A with the spring 76, is energized in the left direction of FIG. 7, the rack 63 does not engage with the pinion 23B, before conveying (loading) the disc into the cabinet 1.

Next, there will be described an operation of the disc drive device while referring to FIGS. 8A to 11. Firstly, there will be described the operation of the trigger slider 6 and the slide cam 7, when loading the disc into the cabinet 1 while referring to FIGS. 8A to 8D.

Figure 8A:
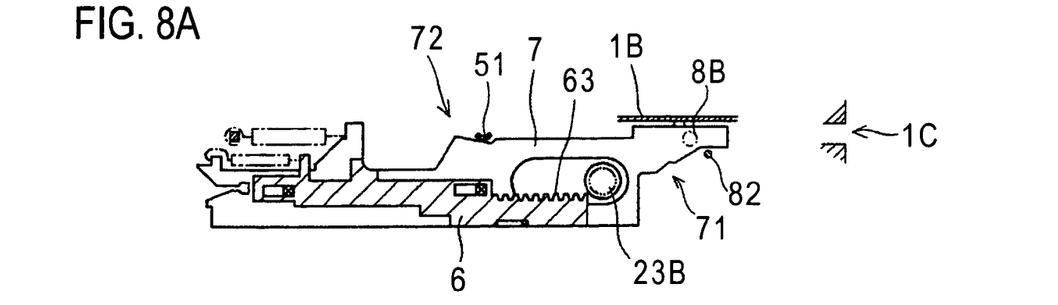
FIGS. 8A to 8D are explanation views of the chucking operation of the disc in the disc drive device according to the embodiment of the present invention.

As shown in FIG. 8A, before loading the disc into the cabinet 1, the rack 63 does not engage with the pinion 23B in the state that the trigger slider 6 and the slide cam 7 are in the initial position. The cam driven element 82 lies on a position being spaced apart from the cam contour part 71. The conveyance roller 8B is in close proximity to the liner plate 30. The projecting piece 51 is put on the chucking cam part 72. In such a state, the clamp board 5B waits the disc while being spaced apart from the turntable 3B.

Figure 8B:
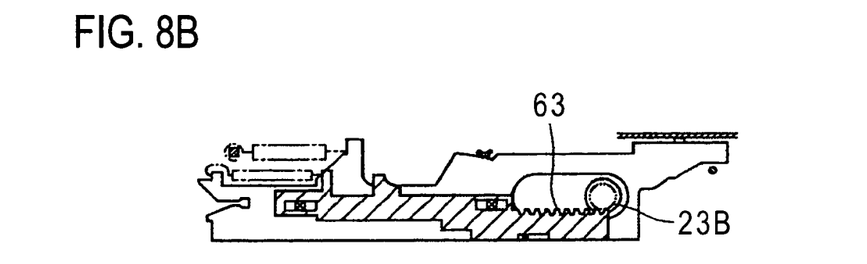

When the disc starts to be inserted into the aperture 1C of the cabinet 1, the conveyance roller 8B rotates in a direction (counterclockwise of FIG. 8) of carrying the disc in the inside of the cabinet 1, while a sensor (not shown) detects insertion of the disc. The disc is conveyed inside the cabinet 1 while being sandwiched between the conveyance roller 8B and the liner plate 30. When an end surface of the disc presses one end of the swingable lever 5D shown in FIG. 3, the trigger slider 6 is pushed in an opposite direction (ejecting direction) against the disc in the course of being loaded via the actuation plate 5C. Herewith, as shown in FIG. 8B, the rack 63 engages with the pinion 23B. At this time, since the pinion 23B is rotated counterclockwise in synchronization with rotation of the conveyance roller 8B, when the rack 63 engages with the pinion 23B, the trigger slider 6 moves in the right direction of FIG. 8B.

Figure 8C:
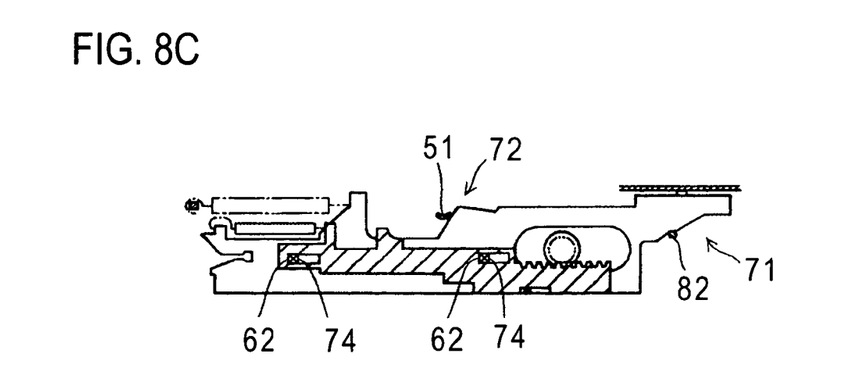

When the trigger slider 6 starts to move, as shown in FIG. 8C, the pressurization parts 62, 62 of the trigger slider 6 come into pressure-contact with the engagement parts 74, 74 of the slide cam 7, and move the slide cam 7 in the same direction as the moving direction of the trigger slider 6. Herewith, the projecting piece 51 is gradually released from the chucking cam part 72, and moves the clamp board 5B toward the turntable 3B side, so that the chucking operation of the disc starts. At the same time, the cam driven element 82 starts to be pressed by the cam contour part 71, and moves the conveyance roller 8B in the direction (lower side of FIG. 8C) being spaced apart from the disc.

Figure 8D:
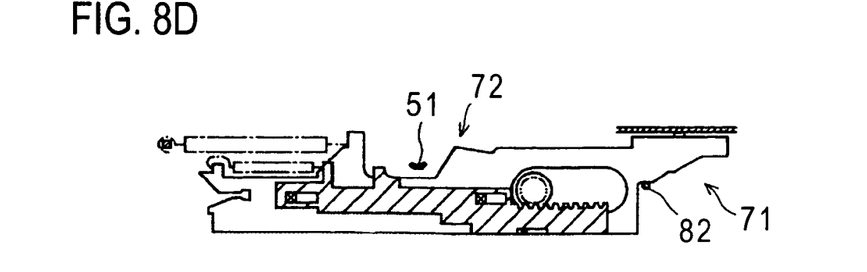

As shown in FIG. 8D, in the state where the chucking operation of the disc is completed, the projecting piece 51 is completely separated from the chucking cam part 72, and the cam driven element 82 is pressed by an end part of the cam contour part 71. Herewith, the clamp board 5B approaches to the turntable 3B, and the conveyance roller 8B continues to be separated from the disc.

Next, there will be described the operation of the trigger slider 6 and the slide cam 7 when ejecting the disc from the inside of the cabinet 1 while referring to FIGS. 9A to 9C.

Figure 9A:
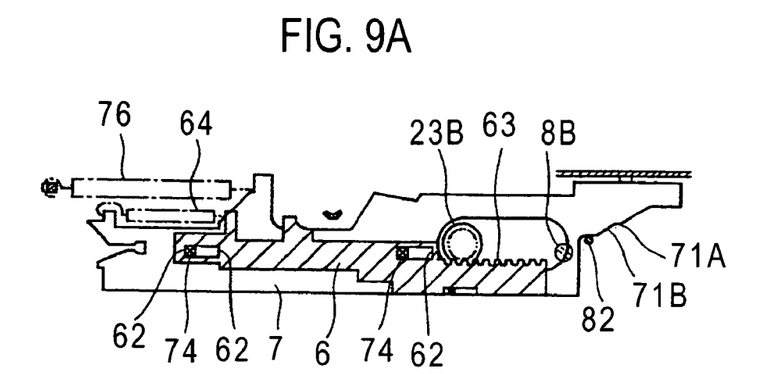
FIGS. 9A to 9C are explanation views of an ejecting operation of the disc in the disc drive device according to the embodiment of the present invention.

As shown in FIG. 9A, at the time the disc is ejected, since the pinion 23B is rotated clockwise in synchronization with rotation of the conveyance roller 8B, the trigger slider 6 starts to move in the left direction of FIG. 9A while the rack 63 engages with the pinion 23B. Although the pressurization parts 62, 62 do not pressurize the engagement parts 74, 74 of the slide cam 7 immediately after the trigger slider 6 starts to move, the slide cam 7 is energized in the left direction of FIG. 9 by the spring 76, and the oblique surface part 71B is pressed by the cam driven element 82. Therefore, when the trigger slider 6 starts to move in the left direction of FIG. 9A, the slide cam 7 also starts to move in the left direction of FIG. 9A in cooperation with the movement of the trigger slider 6. Since the trigger slider 6 and the slide cam 7 do not relatively move each other, the relative position relationship between the trigger slider 6 and the slide cam 7 retains the position relationship (the state where the engagement parts 74, 74 come into contact with the pressurization parts 62, 62) shown in FIG. 9A.

When the cam driven element 82 is positioned at the flat surface part 71A due to movement of the slide cam 7, chucking release of the disc starts, and the conveyance roller 8B comes into contact with the disc and moves the disc in the ejecting direction. When the cam driven element 82 comes into contact with the flat surface part 71A, as shown in FIG. 10, a pressing force F1 from the cam driven element 82, a pressing force (reaction force) F2 from the top plate 1B (the pressure receiving part 1Ba) and an energizing force F3 from the spring 76 act on the slide cam 7. The pressing force F1 acts on the flat surface part 71A in the vertical direction. The pressing force F2 is the reaction force when the boss part 75 comes into contact with the top plate 1B due to the pressing force F1. A frictional force generated by the pressing forces F1, F2 acts on the slide cam 7 as a clamping force restraining the slide cam 7 while resisting against the energizing force F3 of the spring 76. Therefore, the slide cam 7 temporarily stops, and only the trigger slider 6 continues to move in the left direction of FIG. 9B while receiving a transmission drive force from the pinion 23B. A relative position relationship between the slide cam 7 and the trigger slider 6 results in a position relationship shown in FIG. 9B.

Figure 9B:
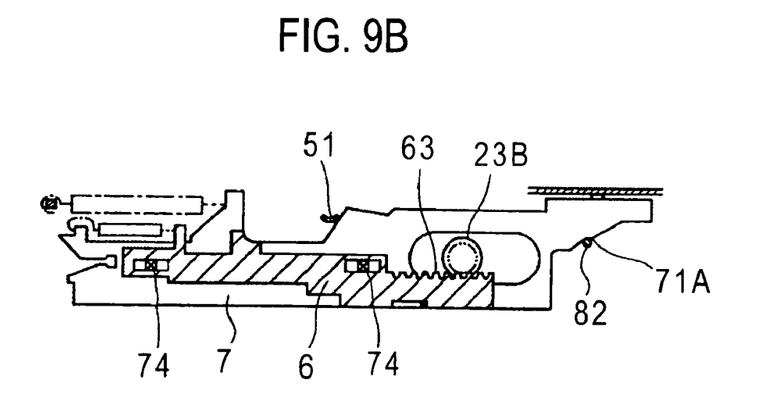
Figure 9C:
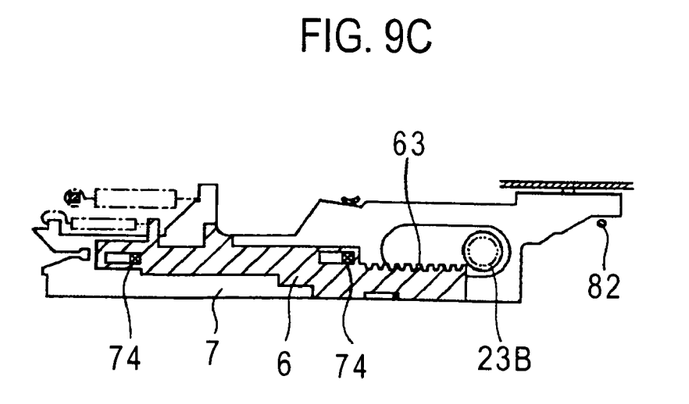
Figure 10:
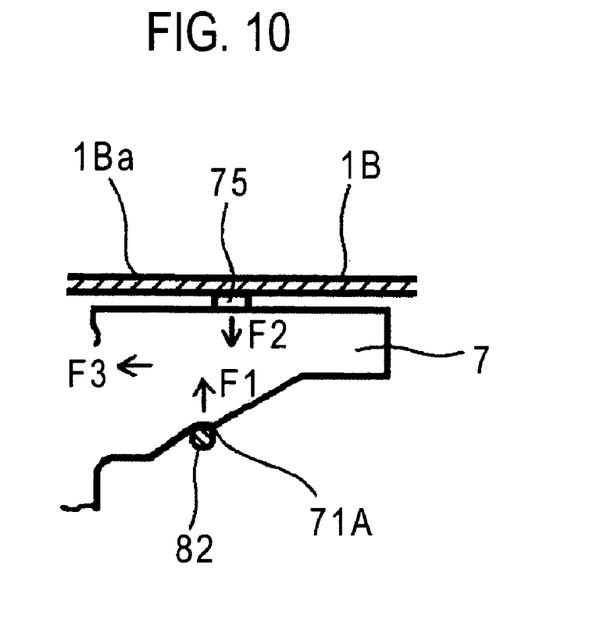
FIG. 10 is a partially enlarged view of a restrained state of a slide cam in the disc drive device according to the embodiment of the present invention.

Therefore, in the state where the pinion 23B engages with the rack 63, even when switching of operation is performed for the loading operation (reload operation) of the disc in the course of ejecting operation of the disc, in the state shown in FIG. 9B, since the trigger slider 6 moves in the right direction of FIG. 9B individually with the slide cam 7 kept stopped, the conveyance roller 8B moves the disc, which is already moved toward the ejecting direction to a certain extent, in the left direction (loading direction) of FIG. 9B. Subsequently, since the slide cam 7 completes chucking of the disc while the slide cam 7 moves, the disc drive device can prevent the disc from being chucked at the improper position. FIG. 9C shows the state where the ejecting operation of the disc is completed without performing switching of operation for the loading operation of the disc.

Figure 11:
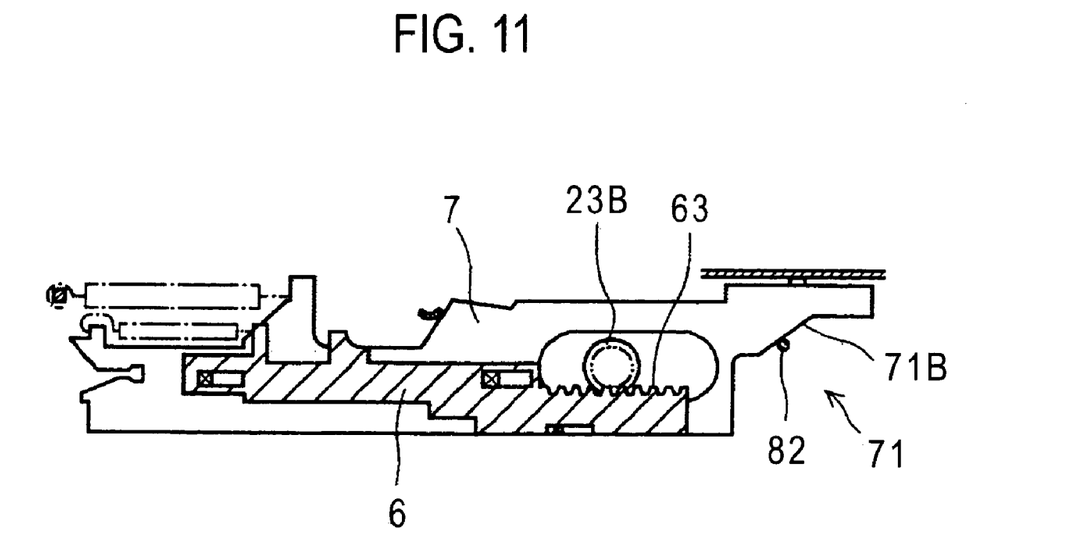
FIG. 11 is a side view of the trigger slider and the slide cam in the state where a flat surface part is not provided at a cam contour part of the disc drive device according to the embodiment of the present invention.

Here, as shown in FIG. 11, in the case where the oblique surface parts 71B, 71B of the cam contour part 71 are connected directly, when switching of operation for the loading operation (reload operation) of the disc is performed in the course of ejecting operation of the disc in the condition that the pinion 23B engages with the rack 63, the slide cam 7 also starts to move in the right direction of FIG. 11 in cooperation with movement of the trigger slider 6. Therefore, since the chucking operation of the disc is performed while the conveyance roller 8B does not move the disc in the left direction (loading direction) of FIG. 11 which the disc is already moved in the ejecting direction to a certain extent, the disc drive device likely performs chucking of the disc at an improper position. In the worst case, there is possibility that the disc is destroyed while the claws 83, 83 shown in FIG. 2 collide with the disc which does not reach the chucking position.

The disc drive device may not be objectionable to be changed appropriately without being limited by the present embodiment. For instance, instead of the liner plate 30, the same kind of roller as the conveyance roller 8B may be mounted on the top plate 1B. Additionally, movement (open/close) of the clamp board 5B may be performed by eliminating the chucking cam part 72 of the slide cam 7, by detecting the position of the slide cam 7 using a sensor, and by driving a member other than the slide cam 7 due to the detection signal.

What is claimed is:

1. A disc drive device comprising:
    a cabinet that has an aperture for putting in and out a disc to and from inside the cabinet;
    a disc conveyance mechanism that has a conveyance roller for conveying the disc between an inside of the cabinet and the aperture while coming into pressure-contact with the disc inserted into the aperture from a single surface side of the disc;
    a roller driver that has a driving source, for forwardly/reversely rotating the conveyance roller;
    a gear transmission unit that has a pinion rotating due to a driving force from the driving source;
    a slide cam that is capable of performing a reciprocating movement in a conveyance direction of the disc; and
    a trigger slider that has a rack engaging with the pinion and moves when the rack engages with the pinion, wherein the trigger slider moves the slide cam in the same direction as a moving direction of the trigger slider while engaging with a part of the slide cam in the course of movement of the trigger slider,
    wherein the disc conveyance mechanism has a cam driven element protruded on a movement route of the slide cam;
    the conveyance roller is energized in a direction coming into pressure-contact with the disc by an elastic member;
    the slide cam has a cam contour part moving the conveyance roller in a direction being spaced apart from the disc against an elastic force of the elastic member while pressing the cam driven element; and
    the cam contour part has a flat surface part formed in parallel to a moving direction of the slide cam, in order to move only the trigger slider, while restraining the slide cam by contact pressure of the cam driven element to stop the slide cam temporary, when conveying the disc inside the cabinet toward the aperture side of the cabinet.

2. The disc drive device according to claim 1, wherein the slide cam has a chucking cam part that leads a clamp board chucking the disc in a direction of separating and contacting from and with a turntable for rotating the disc, in cooperation with the turntable.

3. The disc drive device according to claim 1, wherein the cabinet has a pressure receiving part for sandwiching the slide cam from a vertical direction of the flat surface part of the cam contour part in cooperation with the cam driven element, when the cam driven element lies on the flat surface part.

* * * * *